US012337449B2

(12) United States Patent
Kukucka et al.

(10) Patent No.: US 12,337,449 B2
(45) **Date of Patent: *Jun. 24, 2025**

(54) FOREIGN OBJECT REMOVAL SOCKET ADAPTER

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 341 days.

This patent is subject to a terminal disclaimer.

(21) Appl. No.: 18/054,354

(22) Filed: Nov. 10, 2022

(65) Prior Publication Data

US 2023/0076724 A1 Mar. 9, 2023

Related U.S. Application Data

(63) Continuation-in-part of application No. 16/997,621, filed on Aug. 19, 2020, now Pat. No. 11,511,409, which is a continuation-in-part of application No. 16/514,117, filed on Jul. 17, 2019, now abandoned, and a continuation-in-part of application No. 16/255,341, filed on Jan. 23, 2019, now Pat. No. 11,154,969, and a continuation-in-part of application No. 16/107,842, filed on Aug. 21, 2018, now Pat. No.
(Continued)

(51) Int. Cl.
*B25B 27/18* (2006.01)

(52) U.S. Cl.
CPC .................................... *B25B 27/18* (2013.01)

(58) Field of Classification Search
CPC ........... B25B 13/06; B25B 27/18; B25G 3/04; B25G 3/30
See application file for complete search history.

(56) References Cited

U.S. PATENT DOCUMENTS 1,798,944 A 3/1931 Jackman
2,969,250 A 1/1961 Kull
(Continued)

FOREIGN PATENT DOCUMENTS

AU 201612229 4/2016
AU 201612720 6/2016
(Continued)

*Primary Examiner* — David B. Thomas

(57) ABSTRACT

A foreign object removing socket adaptor includes a pusher, an adaptor, an external thread, an internal tread, and a stop. The pusher includes a drive head and a main shaft. The adaptor includes a tool body, a socket attachment body, and a main channel. The drive head and the main shaft are adjacently connected to each other. The external thread is laterally connected around the main shaft. The stop is connected to the main shaft, opposite of the drive head. The tool body and the socket attachment body are adjacently connected to each other. The main channel concentrically traverses through the tool body and the socket attachment body. The internal thread is laterally connected within the main channel. The main shaft is threadedly engaged with the main channel through the external thread and the internal thread.

9 Claims, 8 Drawing Sheets

Related U.S. Application Data 10,780,556, which is a continuation-in-part of application No. 15/650,768, filed on Jul. 14, 2017, now Pat. No. 10,081,094.

(60) Provisional application No. 62/888,656, filed on Aug. 19, 2019, provisional application No. 62/733,507, filed on Sep. 19, 2018.

(56) References Cited

U.S. PATENT DOCUMENTS

| | | | |
|---|---|---|---|
| 3,405,377 | A | 10/1968 | Pierce |
| 3,495,485 | A | 2/1970 | Knudsen et al. |
| 3,902,384 | A | 9/1975 | Ehrler |
| 3,908,489 | A | 9/1975 | Yamamoto et al. |
| 4,074,597 | A | 2/1978 | Jansson |
| 4,536,115 | A | 8/1985 | Helderman |
| 4,598,616 | A | 7/1986 | Colvin |
| 4,607,547 | A | 8/1986 | Martus |
| 4,893,530 | A | 1/1990 | Warheit |
| 4,927,020 | A | 5/1990 | Randy |
| 4,930,378 | A | 6/1990 | Colvin |
| 5,019,080 | A | 5/1991 | Hemer |
| 5,031,487 | A | 7/1991 | Polonsky |
| 5,219,392 | A | 6/1993 | Ruzicka et al. |
| 5,228,570 | A | 7/1993 | Robinson |
| 5,251,521 | A | 10/1993 | Burda et al. |
| 5,398,823 | A | 3/1995 | Anders |
| 5,481,948 | A | 1/1996 | Zerkovitz |
| 5,501,342 | A | 3/1996 | Geibel |
| 5,519,929 | A | 5/1996 | Bleckman |
| 5,645,177 | A | 7/1997 | Lin |
| 5,669,516 | A | 9/1997 | Horn |
| 5,725,107 | A | 3/1998 | Dembicks |
| 5,737,981 | A | 4/1998 | Hildebrand |
| 5,743,394 | A | 4/1998 | Martin |
| 5,782,148 | A | 7/1998 | Kerkhoven |
| 5,829,327 | A | 11/1998 | Stanton |
| 5,832,792 | A | 11/1998 | Hsieh |
| 5,873,290 | A | 2/1999 | Chaconas |
| 6,009,778 | A | 1/2000 | Hsieh |
| 6,079,299 | A | 6/2000 | Sundstrom |
| 6,092,279 | A | 7/2000 | Shoup |
| 6,352,011 | B1 | 3/2002 | Fruhm |
| 6,431,373 | B1 | 8/2002 | Blick |
| 6,575,057 | B1 | 6/2003 | Ploeger |
| 6,626,067 | B1 | 9/2003 | Iwinski |
| 6,698,316 | B1 | 3/2004 | Wright |
| 6,729,208 | B1 | 5/2004 | Chrzanowski |
| 6,755,098 | B2 | 6/2004 | Huang |
| 6,761,089 | B2 | 7/2004 | Bergamo |
| 6,857,340 | B2 | 2/2005 | Wagner |
| 6,951,156 | B2 | 10/2005 | Garg |
| 7,000,501 | B1 | 2/2006 | Chen |
| D524,615 | S | 7/2006 | Albertson |
| 7,137,514 | B1 | 11/2006 | Nickipuck |
| 7,225,710 | B2 | 6/2007 | Pacheco, Jr. |
| 7,331,260 | B2 | 2/2008 | Cheng |
| 7,434,494 | B1 | 10/2008 | Snider |
| 7,717,278 | B2 | 1/2010 | Kao |
| D614,931 | S | 5/2010 | Su |
| 7,788,994 | B2 | 9/2010 | Wright et al. |
| 7,841,480 | B2 | 11/2010 | Hsieh |
| 7,913,593 | B2 | 3/2011 | Dahar et al. |
| 8,166,851 | B2 | 5/2012 | Pchola |
| 8,302,255 | B2 | 11/2012 | Lin |
| 8,336,709 | B1 | 12/2012 | Geibel |
| 9,132,533 | B2 | 9/2015 | Lesche et al. |
| D745,814 | S | 12/2015 | Hsieh |
| D776,505 | S | 1/2017 | Doroslovac |
| D784,106 | S | 4/2017 | Doroslovac |
| 9,687,968 | B2 | 6/2017 | Doroslovac et al. |
| D794,405 | S | 8/2017 | Doroslovac et al. |
| 9,718,170 | B2 | 8/2017 | Eggert et al. |
| D798,682 | S | 10/2017 | Doroslovac et al. |
| 9,873,195 | B1 | 1/2018 | Buxton |
| 9,878,441 | B1 | 1/2018 | Kao |
| D829,069 | S | 9/2018 | Doroslovac et al. |
| 10,081,094 | B2 | 9/2018 | Doroslovac et al. |
| 10,328,554 | B2 * | 6/2019 | Todd ........................ B25B 23/12 |
| D859,944 | S | 9/2019 | Kukucka et al. |
| D859,945 | S | 9/2019 | Kukucka et al. |
| D859,946 | S | 9/2019 | Kukucka et al. |
| D859,947 | S | 9/2019 | Kukucka et al. |
| D867,841 | S | 11/2019 | Kukucka et al. |
| D868,553 | S | 12/2019 | Kukucka et al. |
| 10,493,519 | B2 | 12/2019 | Ross |
| D879,577 | S | 3/2020 | Kukucka et al. |
| D880,968 | S | 4/2020 | Kukucka et al. |
| D880,977 | S | 4/2020 | Kukucka et al. |
| D885,149 | S | 5/2020 | Kukucka et al. |
| D887,233 | S | 6/2020 | Kukucka et al. |
| D887,711 | S | 6/2020 | Kukucka et al. |
| D889,224 | S | 7/2020 | Kukucka et al. |
| D889,257 | S | 7/2020 | Kukucka et al. |
| D892,578 | S | 8/2020 | Kukucka et al. |
| 10,780,556 | B2 | 9/2020 | Kukucka et al. |
| 10,786,890 | B2 | 9/2020 | Kukucka et al. |
| D899,091 | S | 10/2020 | Kukucka et al. |
| 10,828,766 | B2 | 11/2020 | Kukucka et al. |
| D904,152 | S | 12/2020 | Kukucka et al. |
| D906,781 | S | 1/2021 | Kukucka et al. |
| 10,882,162 | B2 | 1/2021 | Kukucka et al. |
| D909,842 | S | 2/2021 | Kukucka et al. |
| D910,490 | S | 2/2021 | Lim et al. |
| 10,919,133 | B2 | 2/2021 | Kukucka et al. |
| 10,967,488 | B2 | 4/2021 | Kukucka et al. |
| 11,045,925 | B2 | 6/2021 | Kukucka et al. |
| 11,154,969 | B2 | 10/2021 | Kukucka et al. |
| 11,511,409 | B2 * | 11/2022 | Kukucka ................. B25B 27/18 |
| 2003/0209111 | A1 | 11/2003 | Huang |
| 2004/0256263 | A1 | 12/2004 | Shih |
| 2005/0098459 | A1 | 5/2005 | Gorman |
| 2005/0103664 | A1 | 5/2005 | Shih |
| 2005/0194330 | A1 | 9/2005 | Ziske |
| 2005/0257357 | A1 | 11/2005 | Huang |
| 2005/0274233 | A1 | 12/2005 | Lin |
| 2006/0130618 | A1 | 6/2006 | Hsieh |
| 2006/0156869 | A1 | 7/2006 | Hsieh |
| 2006/0266168 | A1 | 11/2006 | Pacheco, Jr. |
| 2007/0261519 | A1 | 11/2007 | Cheng |
| 2008/0235930 | A1 | 10/2008 | English |
| 2009/0007732 | A1 | 1/2009 | Hsieh |
| 2009/0120885 | A1 | 5/2009 | Kao |
| 2009/0220321 | A1 | 9/2009 | Sakamura |
| 2010/0064863 | A1 | 3/2010 | Kozak |
| 2010/0065520 | A1 | 3/2010 | Hsieh |
| 2011/0056339 | A1 | 3/2011 | Su |
| 2011/0303052 | A1 | 12/2011 | Chen |
| 2012/0060656 | A1 | 3/2012 | Chang |
| 2012/0132039 | A1 | 5/2012 | Su |
| 2012/0210826 | A1 | 8/2012 | Stawarski |
| 2013/0047798 | A1 | 2/2013 | Huang |
| 2014/0260832 | A1 | 9/2014 | Hsiao |
| 2014/0311302 | A1 | 10/2014 | Taguchi et al. |
| 2014/0331826 | A1 | 11/2014 | Campbell |
| 2014/0360321 | A1 | 12/2014 | Steinweg et al. |
| 2015/0135910 | A1 | 5/2015 | Eggert et al. |
| 2015/0266169 | A1 | 9/2015 | Campbell, II |
| 2015/0314429 | A1 | 11/2015 | Doroslovac |
| 2015/0321332 | A1 | 11/2015 | Lee |
| 2016/0046008 | A1 | 2/2016 | Thomas |
| 2016/0067853 | A1 | 3/2016 | Neto |
| 2016/0136792 | A1 | 5/2016 | Harp |
| 2016/0223005 | A1 | 8/2016 | Rathmann |
| 2016/0271764 | A1 | 9/2016 | Huang |
| 2016/0339564 | A1 | 11/2016 | Chen |
| 2017/0028538 | A1 | 2/2017 | Lourenco et al. |
| 2017/0246733 | A1 | 8/2017 | Shehab |
| 2017/0252905 | A1 | 9/2017 | Doroslovac |
| 2017/0282337 | A1 | 10/2017 | Johnson et al. |
| 2017/0312839 | A1 | 11/2017 | Moss et al. |
| 2017/0312897 | A1 | 11/2017 | Doroslovac et al. |
| 2018/0001450 | A1 | 1/2018 | Anderson |

(56) References Cited

U.S. PATENT DOCUMENTS

| | | | |
|---|---|---|---|
| 2018/0003241 A1 | 1/2018 | Goss |
| 2018/0141192 A1 | 5/2018 | Chang |
| 2018/0354022 A1 | 12/2018 | Ross et al. |
| 2018/0354102 A1 | 12/2018 | Kukucka et al. |
| 2019/0001469 A1 | 1/2019 | Cho et al. |
| 2019/0015961 A1 | 1/2019 | Kukucka et al. |
| 2019/0152033 A1 | 5/2019 | Kukucka et al. |
| 2019/0217449 A1 | 7/2019 | Lee |
| 2019/0283233 A1 | 9/2019 | Kukucka et al. |
| 2019/0337131 A1 | 11/2019 | Kukucka et al. |
| 2019/0375077 A1 | 12/2019 | Kukucka et al. |
| 2020/0070321 A1 | 3/2020 | Schulz |
| 2020/0078908 A1 | 3/2020 | Wu et al. |
| 2020/0269398 A1 | 8/2020 | Donovan |
| 2020/0298380 A1 | 9/2020 | Doroslovac et al. |
| 2020/0376648 A1 | 12/2020 | Kukucka et al. |
| 2020/0391360 A1 | 12/2020 | Kukucka et al. |
| 2021/0039245 A1 | 2/2021 | Kukucka et al. |

FOREIGN PATENT DOCUMENTS

| | | | |
|---|---|---|---|
| AU | 201612721 | | 6/2016 |
| CA | 2564093 | A1 | 4/2007 |
| CA | 168071 | | 12/2016 |
| CA | 2898480 | A1 | 7/2017 |
| CN | 2767068 | Y | 3/2006 |
| CN | 3630254 | | 6/2006 |
| CN | 201046555 | Y | 4/2008 |
| CN | 101208181 | A | 6/2008 |
| CN | 101973013 | | 2/2011 |
| CN | 102395447 | | 3/2012 |
| CN | 102554833 | A | 7/2012 |
| CN | 103639950 | A | 3/2014 |
| CN | 204186727 | U | 3/2015 |
| CN | 303924849 | | 11/2016 |
| CN | 303956827 | | 12/2016 |
| CN | 303984883 | | 12/2016 |
| CN | 207548606 | U | 6/2018 |
| CN | 207824800 | | 9/2018 |
| DE | 3911409 | A1 | 10/1990 |
| DE | 9403220 | U1 | 4/1994 |
| DE | 4321325 | A1 | 1/1995 |
| DE | 29613327 | U1 | 9/1996 |
| DE | 10321284 | A1 | 12/2004 |
| DE | 202010006146 | U1 | 7/2010 |
| DE | 202012103034 | | 11/2012 |
| DE | 102012104298 | A1 | 11/2013 |
| DE | 102013021238 | A1 | 6/2015 |
| EP | 0930132 | A2 | 7/1999 |
| EP | 0930132 | A3 | 11/2000 |
| EP | 1371453 | A2 | 12/2003 |
| EP | 1731774 | A1 | 12/2006 |
| EP | 0930132 | B1 | 4/2007 |
| EP | 2363245 | | 9/2011 |
| EP | 2363245 | A2 | 9/2011 |
| EP | 2363245 | A3 | 7/2015 |
| GA | 906839 | A | 9/1962 |
| GB | 906839 | A | 9/1962 |
| GB | 1294764 | A | 11/1972 |
| GB | 2366532 | A | 3/2002 |
| JP | H06-15580 | | 1/1994 |
| JP | H0737805 | | 4/1995 |
| JP | 2011143522 | | 7/2011 |
| JP | 2012157913 | | 10/2011 |
| JP | 2014100742 | | 6/2014 |
| JP | 2017042898 | A | 3/2017 |
| JP | 2015180835 | A | 7/2017 |
| KR | 200149097 | Y1 | 7/1999 |
| RU | 2152870 | C1 | 7/2000 |
| RU | 2225786 | C2 | 1/2001 |
| RU | 45671 | U1 | 5/2005 |
| RU | 58510 | U1 | 11/2006 |
| RU | 2387533 | C1 | 4/2010 |
| RU | 116398 | | 5/2012 |
| RU | 180548 | U1 | 6/2018 |
| SU | 16616 | A1 | 8/1930 |
| TW | M442238 | U | 12/2012 |
| TW | 201341127 | A | 10/2013 |
| TW | 201617181 | A | 5/2016 |
| TW | 201813785 | A | 4/2018 |
| TW | 201829135 | A | 8/2018 |
| WO | 9416862 | A | 8/1994 |
| WO | 1994016862 | A1 | 8/1994 |
| WO | 1996010932 | A1 | 4/1996 |
| WO | 1996026870 | A1 | 9/1996 |
| WO | 1996027745 | A1 | 9/1996 |
| WO | 1997010926 | A1 | 3/1997 |
| WO | 1998012982 | A1 | 4/1998 |
| WO | 999032264 | | 7/1999 |
| WO | 1999032264 | A1 | 7/1999 |
| WO | 2001066312 | A1 | 9/2001 |
| WO | 2004002687 | A1 | 1/2004 |
| WO | 2005070621 | | 8/2005 |
| WO | 2006023374 | | 3/2006 |
| WO | 2006130490 | A | 12/2006 |
| WO | 2006130490 | A1 | 12/2006 |
| WO | 2010007402 | A1 | 1/2010 |
| WO | 2011109040 | A1 | 9/2011 |
| WO | 2013028875 | A1 | 2/2013 |
| WO | 2015013246 | A | 1/2015 |
| WO | 2015082283 | A1 | 6/2015 |
| WO | 2015050942 | A1 | 9/2015 |
| WO | 2016005180 | A | 1/2016 |
| WO | 2016051080 | A1 | 4/2016 |
| WO | DM/090809 | | 4/2016 |
| WO | DM/091188 | | 5/2016 |
| WO | DM/091189 | | 5/2016 |
| WO | 2016174615 | A1 | 11/2016 |
| WO | WO2017069953 | A1 | 4/2017 |
| WO | 2017178997 | | 10/2017 |
| WO | 2017187388 | A1 | 11/2017 |
| WO | 2018150360 | | 8/2018 |
| WO | 2018150360 | A1 | 8/2018 |
| WO | 2018172831 | | 9/2018 |
| WO | 2019012486 | | 1/2019 |
| WO | 2019167032 | | 9/2019 |
| WO | 2019175652 | | 9/2019 |
| WO | 2020039281 | | 2/2020 |
| WO | 2020039285 | | 2/2020 |
| WO | 2020058777 | | 3/2020 |
| WO | 2020152516 | | 7/2020 |
| WO | 2020208608 | | 10/2020 |
| WO | 2020225800 | | 11/2020 |
| WO | 2021001696 | | 1/2021 |
| WO | 2021019500 | | 2/2021 |
| WO | 2021033152 | | 2/2021 |
| WO | 2022047236 | A1 | 3/2022 |

* cited by examiner

FOREIGN OBJECT REMOVAL SOCKET ADAPTER

FIELD OF THE INVENTION

The present invention relates generally relates to tools designed for extracting or removing fasteners, in particular bolts and nuts. More specifically, the present invention discloses two engaging tool bodies that collectively remove jammed foreign objects from tools used for extracting or removing fasteners.

BACKGROUND OF THE INVENTION

Hex bolts, nuts, screws, and other similar threaded devices are used to secure and hold multiple components together by being engaged to a complimentary thread or the actual material itself. Bolt and screws have generally structure of a cylindrical shaft with an external thread and a head at one end of the shaft. Nuts are generally shaped into cylindrical bodies with an internal thread. When a socket and wrench is used to remove these kinds of threaded devices, often times the threaded devices can get jammed into the socket thus resulting difficulties to separate them from the socket. The present invention functions as a foreign object removing socket adaptor so that the jammed threaded devices from the socket can be easily dislodged.

The object of the present invention is to provide a system able to remove any foreign jammed devices from the socket without damaging the socket in any way. Moreover, the present invention is versatile in the sense that the present invention can be used for any shape, size, or orientation of sockets. The present invention is a removal system that virtually eliminates the chance of socket or threaded devices to be damaged. The present invention uses two components which work together in order to extract the foreign object jammed in the socket.

DETAIL DESCRIPTIONS OF THE INVENTION

All illustrations of the drawings are for the purpose of describing selected versions of the present invention and are not intended to limit the scope of the present invention.

Figure 1:
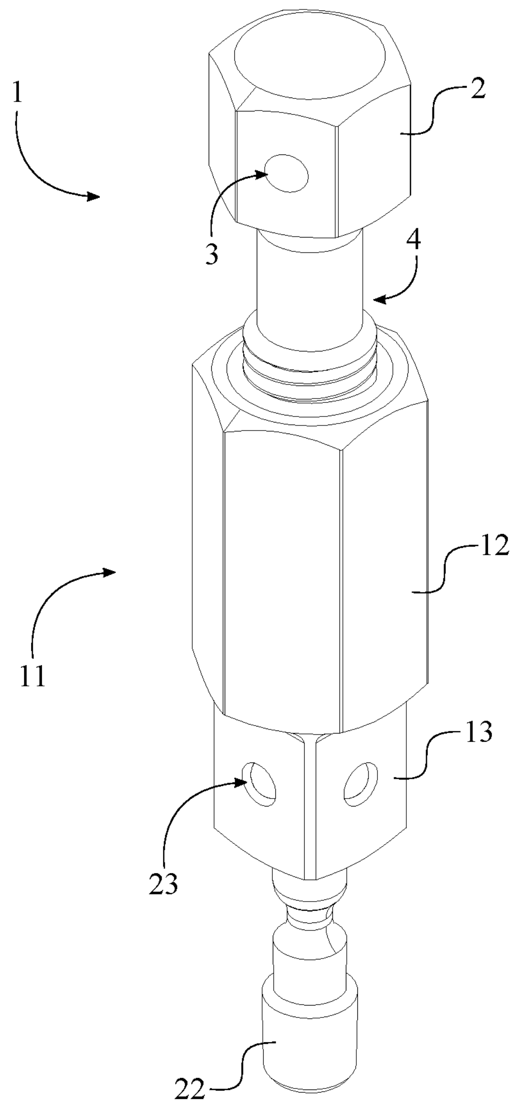
FIG. 1 is a top perspective view of the present invention.
Figure 2:
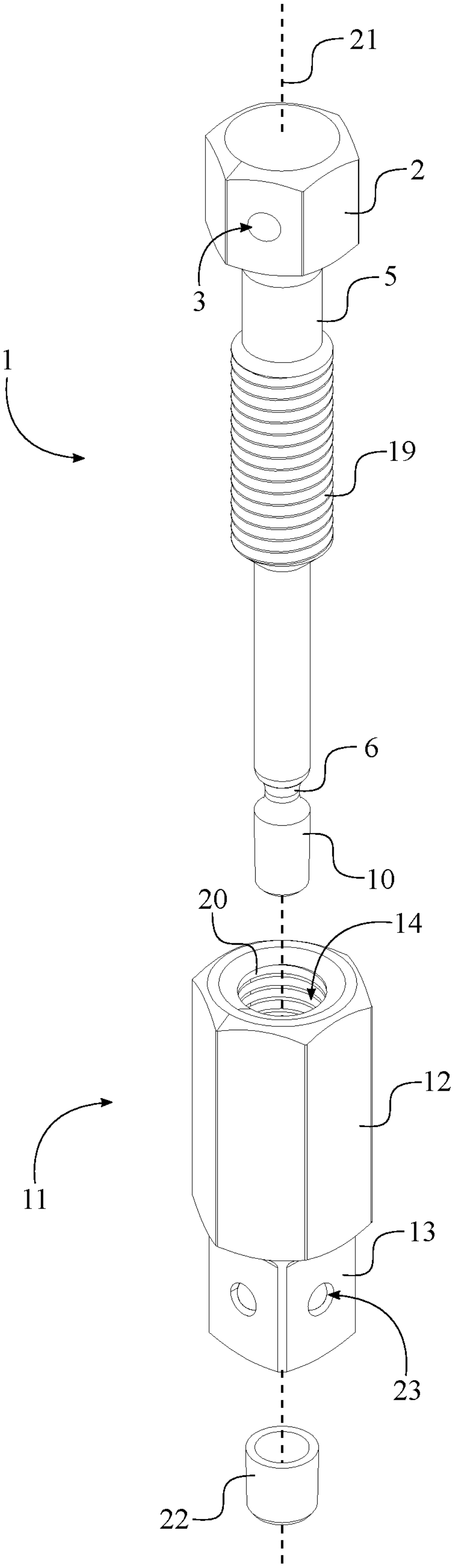
FIG. 2 is an exploded view of the present invention along the rotational axis.

The present invention is a foreign object removing socket adaptor so that the utilization of the present invention is able to push out any foreign object out of the socket. The present invention comprises a pusher 1, an adaptor 11, an external thread 19, an internal thread 20, and a stop 22 as shown in FIG. 1-2. The pusher 1 that pushes out the foreign object from the socket comprises a drive head 2 and a main shaft 4. The adaptor 11 that concentrically aligns and mounts the pusher 1 with the socket comprises a tool body 12, a socket attachment body 13, and a main channel 14.

In reference to a general configuration of the present invention, the pusher 1, the adaptor 11, the external thread 19, and the internal thread 20 are concentrically positioned around a rotational axis 21 of the present invention as shown in FIG. 1-2. The drive head 2 and the main shaft 4 are adjacently connected to each other thus delineating the overall structure of the pusher 1. The stop 22 is radially connected around the main shaft 4 and positioned opposite of the drive head 2. The tool body 12 and the socket attachment body 13 are adjacently connected to each other thus delineating the overall structure of the adaptor 11. The main channel 14 concentrically traverses through the tool body 12 and the socket attachment body 13 in order to facilitate the engagement of the pusher 1. The external thread 19 is laterally connected around the main shaft 4. The internal thread 20 is laterally connected within the main channel 14. As a result, the main shaft 4 is able to threadedly engage with the main channel 14 through the external thread 19 and the internal thread 20 thus allowing the main shaft 4 to selectively exits about the socket attachment body 13. The socket attachment body 13 functions as the connecting member so that the present invention can be mounted to the socket. Once torque is applied to the drive head 2, the main shaft 4 that is engaged within the main channel 14 is able to emerge through the socket attachment body 13 thus pushing out the foreign objects from the socket.

Figure 3:
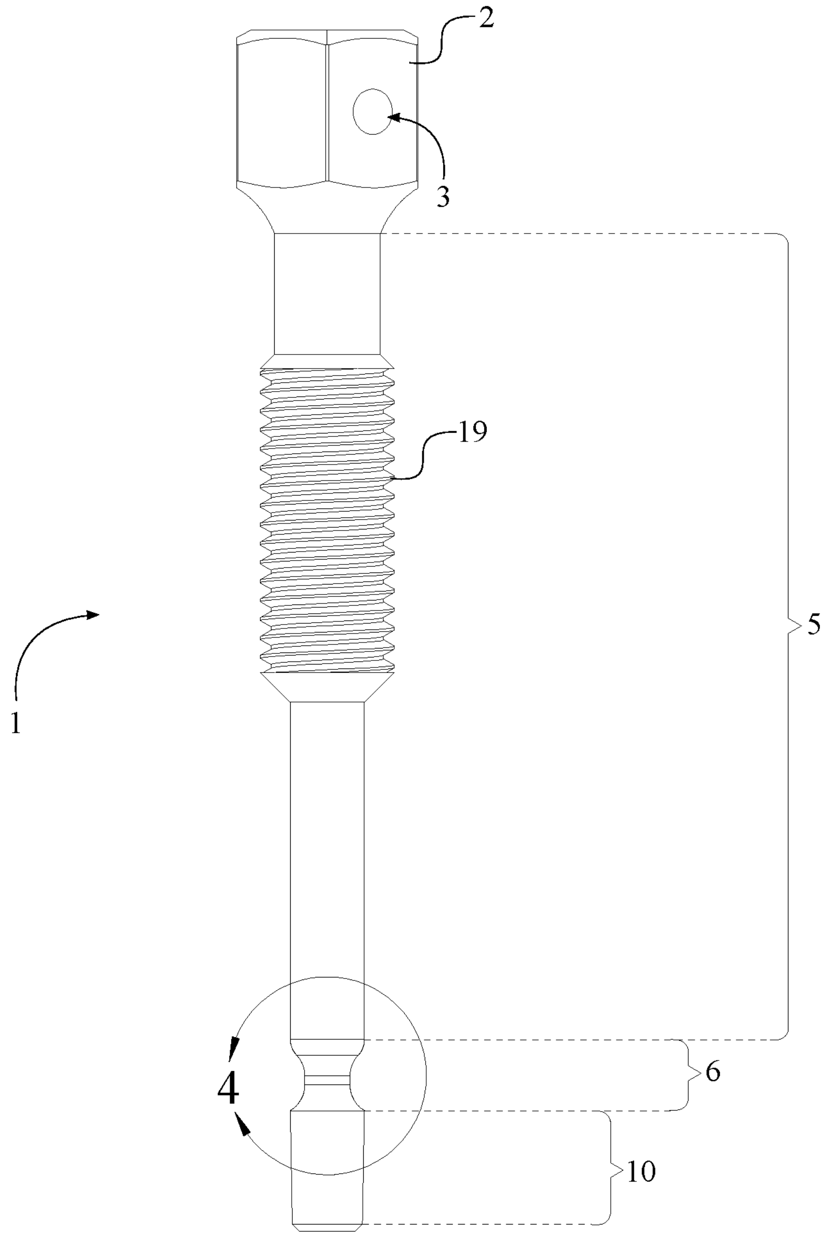
FIG. 3 is a side view of the pusher of the present invention.

In reference to FIG. 1-3, the drive head 2 is a physical structure that is used to apply torque. The drive head 2 is preferably formed into a hexagonal shaped structure but can be a square shape or any other viable shape that permits the application of torque. In the preferred embodiment of the present invention, the drive head 2 allows the user to apply torque to the main shaft 4 in either clockwise direction or counterclockwise direction. A diameter of the drive head 2 is larger than a diameter of the main shaft 4 so that the drive head 2 can act as a stopper for the pusher 1 as the main shaft 4 cannot be completely removed or fully emerged through the socket attachment body 13. Alternatively, a band or protrusion may be attached or mounted to the main shaft to provide a stop. The drive head 2 can be rotated using any existing torque tools or drivers including ratchets, pneumatic drivers, drills, impact drivers, wrenches and any other socket attachments or driving mechanisms.

In reference to FIG. 3, the pusher 1 further comprises a torque-applying opening 3. More specifically, the torque-applying opening 3 laterally traverses through the drive head 2 and is oriented perpendicular to the main shaft 4. The torque-applying opening 3 is preferably formed into a circular shape; however, the torque-applying opening 3 is not limited to the circular shape and can be any other geometrical shape within the present invention. The torque-applying opening 3 accepts a matching shaped shaft for applying torque when the pusher 1 is rotated by the user's hand. When the matching shaped shaft is fitted into the torque-applying opening 3, the matching shaped shaft acts as a handle for the drive head 2 so that an ergonomic grip can be provided for the user's hand to apply torque. The matching shaped shaft may further comprise a retaining body to temporarily retain the matching shaped shaft within the torque-applying opening 3 and prevents from falling out during usage.

The main shaft 4 is a rod-like structure and fitted into the main channel 14 so that the foreign object can be pushed out from the socket. In reference to FIG. 3, the main shaft 4 comprises an elongated section 5, a recessed section 6, and a tip section 10. The elongated section 5 and the tip section 10 are oppositely positioned of each other about the recessed section 6, wherein the elongated section 5, the recessed section 6, and the tip section 10 are concentrically positioned along the rotational axis 21. In order to delineate the rod-like structure, the elongated section 5 terminally connected to the recessed section 6. The tip section 10 is terminally connected to the recessed section 6. The drive head 2 is terminally connected to the elongated section 5 and positioned opposite of the recessed section 6 so that the tip portion and the recessed portion can be positioned adjacent to the socket attachment body 13. The elongated section 5 and the tip section 10 are preferably parallel and on the same plane but may be offset by different diameters or by tapering the elongated section 5 and/or the tip section 10. It is noted that once the main shaft 4 has been engaged with the adapter 11 as the corresponding parts are designed to be permanently engaged with each other.

The elongated section 5 is a cylindrical shaft so that the pusher 1 can be engaged within the main channel 14. More specifically, the external thread 19 is laterally connected around the elongated section 5 and positioned in between the recessed section 6 and the drive head 2. In other words, the external thread 19 is partially extended along the elongated section 5 wherein a length of the external thread 19 is preferably smaller than a length of the elongated section 5; however in some embodiment, the external thread 19 may be the same length or longer in length than the elongated section 5. In the preferred embodiment of the present invention, the external thread 19 is a male-type thread; however, in an alternative embodiment of the present invention, the external thread 19 can be a female-type thread.

Figure 10:
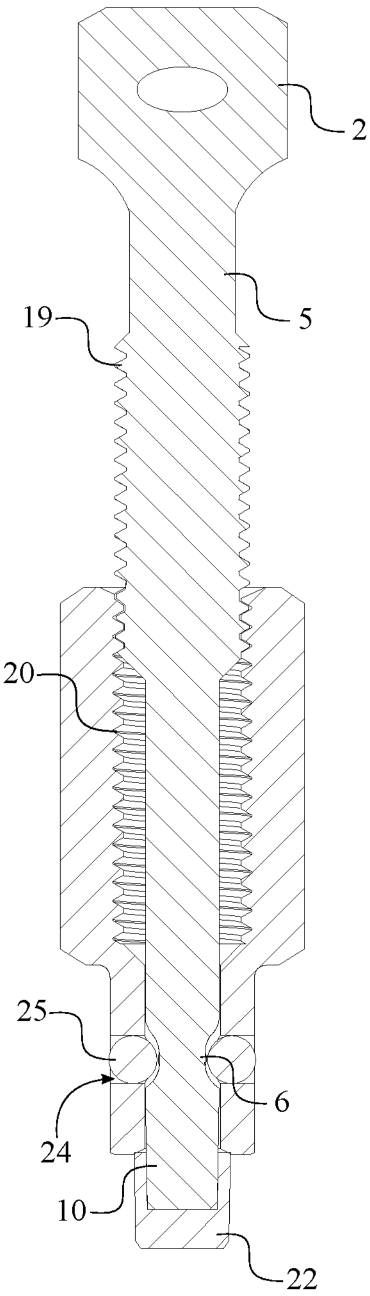
FIG. 10 is a cross section view of the present invention taken along line 10-10 of FIG. 9.

The stop 22 functions as a stopper for the pusher 1 so that the pusher 1 does not disengage about the tool body 12. In reference to FIG. 10, the stop 22 is connected to the tip section 10 so that the stop 22 can be pressed against the socket attachment body 13. In some embodiments, as shown in FIG. 10, the stop 22 is radially connected around the tip section 10. More specifically, an outer diameter of the stop 22 is slightly larger than the channel about the socket attachment body 13 and slightly smaller than the outer diameter of the socket attachment body 13. For embodiments in which the stop 22 is not circular, it is preferred that the stop be of a size larger than the channel about the socket engagement body 13 and smaller than the socket engagement body 13. This size for the stop 12 prevents the stop 12 from passing through the channel about the socket attachment body 13 while being small enough not to obstruct the exterior of the socket attachment body 13. As a result, the stop 22 is able to press against the socket attachment body 13 thus preventing the pusher 1 from disengaging from the adaptor 11. Alternatively, the stop 22 can be designed to fit permanently over the tip section 10. Alternatively, the stop 22 can be further integrated with an aperture at a top base of the stop 22 that is sized to match the diameter of the tip section 10. A bottom base of the stop 22 is preferably flat but may be a convex or concave shape if preferred. A sidewall of the stop 22 may be straight or tapered. Alternative components may be used as a stopper in lieu of the stop 22 including, but are not limited to, a spring ring, pin, protrusion, annular flange, cap, or collet. Furthermore, the tip section 10 may be manufactured in alternative methods thus providing a larger diameter tip than a bottom channel section 16 of the main channel 14 without the need to attach the stop 22 or the tip section 10 may be smaller in diameter than the bottom channel 16 if preferred.

Figure 4:
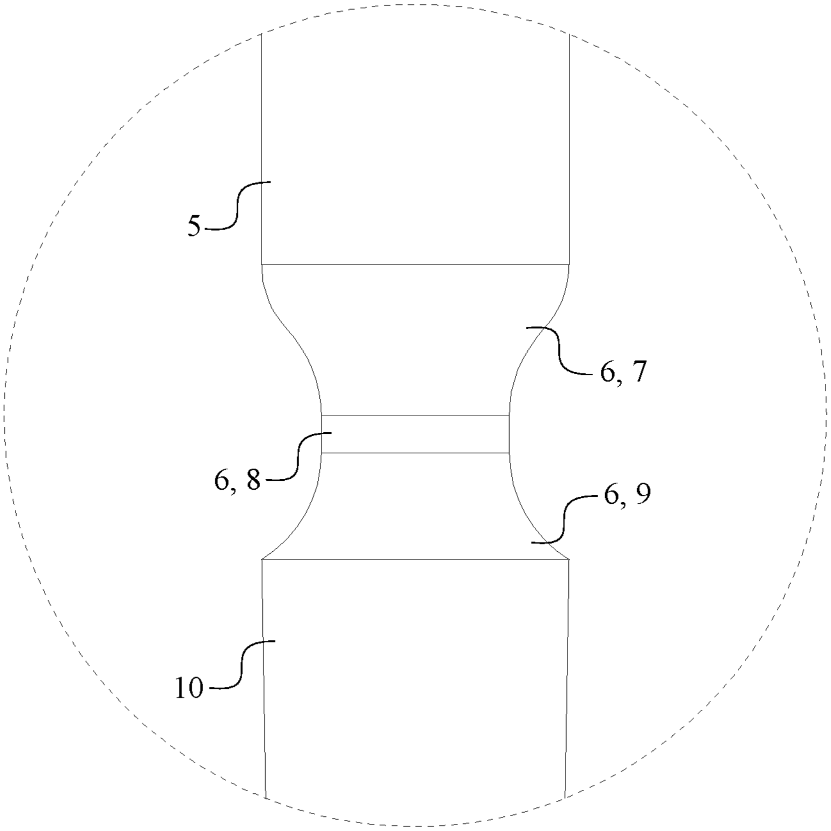
FIG. 4 is a detailed view of the recessed section of the pusher of the present invention.

The recessed section 6 functions as an engaging/disengaging feature between the socket attachment body 13 and the socket so that the present invention can be easily attached or removed from the socket. In reference to FIG. 4, the recessed section 6 comprises a first tapered section 7, a flat section 8, and a second tapered section 9. More specifically, the first tapered section 7 and the second tapered section 9 are oppositely positioned of each other about the flat section 8. The first tapered section 7 is terminally connected to the elongated section 5 and the flat section 8. The second tapered section 9 is terminally connected to the tip section 10 and the flat section 8. The first tapered section 7, a flat section 8, and a second tapered section 9 may vary in length and ratio to each other. Furthermore, the recessed section 6 is configured to relieve pressure from at least one retaining assembly 23 of the present invention so that the socket can be easily removed from the socket attachment body 13.

The retaining assembly 23 functions as a fastening mechanism within the present invention so that socket can be locked and unlocked from the socket attachment body 13. The retaining assembly 23 comprises a cavity 24 and a retaining body 25. In one embodiment, the retaining body 25 is a spherical ball bearing, as shown in FIG. 7-10. The cavity 24 laterally traverses into the main channel 14 through the socket attachment body 13 and oriented perpendicular to the main channel 14. The retaining body 25 is engaged within the cavity 24 so that up and down movement of the main shaft 4 is able to control the lateral movement of the retaining body 25 within the retaining assembly 23. For example, when the socket has to be disengaged from the socket attachment body 13, the recessed section 6 of the main shaft 4 has to be aligned with the cavity 24 to relieve pressure from the retaining body 25 as shown in FIG. 10. When the pusher 1 is utilized to push out foreign object out of the socket, the recessed section 6 is positioned offset from the cavity 24. Resultantly, the elongated section 5 outwardly applies pressure to the retaining body 25 thus engaging and securing the socket with the socket attachment body 13 via the retaining body 25. It is considered obvious alternative embodiments of the present invention may use pins, spring rings, circular ring style expanding mechanisms or any other components able to function within the scope of the present invention that are integrated into the main shaft 4 instead of the retaining body 25.

Preferably, the first tapered section 7 and the second tapered section 9 may be concave or convex in order to ease the lateral movement of the retaining body 25. Additionally, the first tapered section 7 and the second tapered section 9 may be straight sections that are angularly positioned with respect to the flat section 8. As a result, the retaining body 25 is able to gradually move in and out of the cavity 24 as concave, convex, or straight section when the recessed section 6 applies pressure to the retaining body 25. Similarly, the flat section 8 is preferably a flat surface but may be a concave or convex surface.

Furthermore, the intersecting point between the recessed section 6 and the elongated section 5 can be a sharp corner or a smooth radial corner as preferred by the user or the manufacture. Similarly, the intersecting point between the recessed section 6 and the tip section 10 can be a sharp corner or a smooth radial corner as preferred by the user or the manufacture.

In the preferred embodiment of the present invention, the tool body 12 is hexagonal in shape but can be of any other viable shapes or forms including but not limited to square or circular. The hexagonal shape allows the tool body 12 to be easily engaged with existing wrenches and other similar tools so that the tool body 12 can be stationary while the pusher 1 is rotated about the rotational axis 21.

In the preferred embodiment of the present invention, the socket attachment body 13 is shaped to a drive square of a ratchet so that any existing socket can be easily attached to the socket attachment body 13. However, the socket attachment body 13 is not limited to the drive square shape and can be any other types of geometrical shape that facilitate the attachment of any existing socket or other embodiments able to use the function of the present invention.

Figure 5:
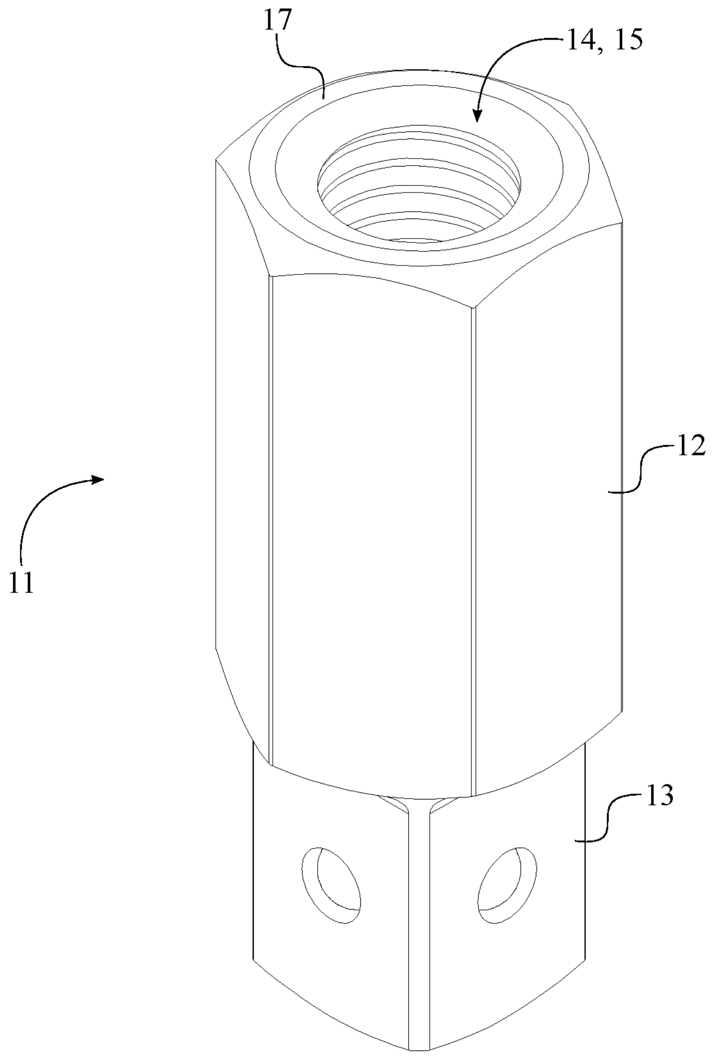
FIG. 5 is a top perspective view of the adaptor of the present invention.
Figure 6:
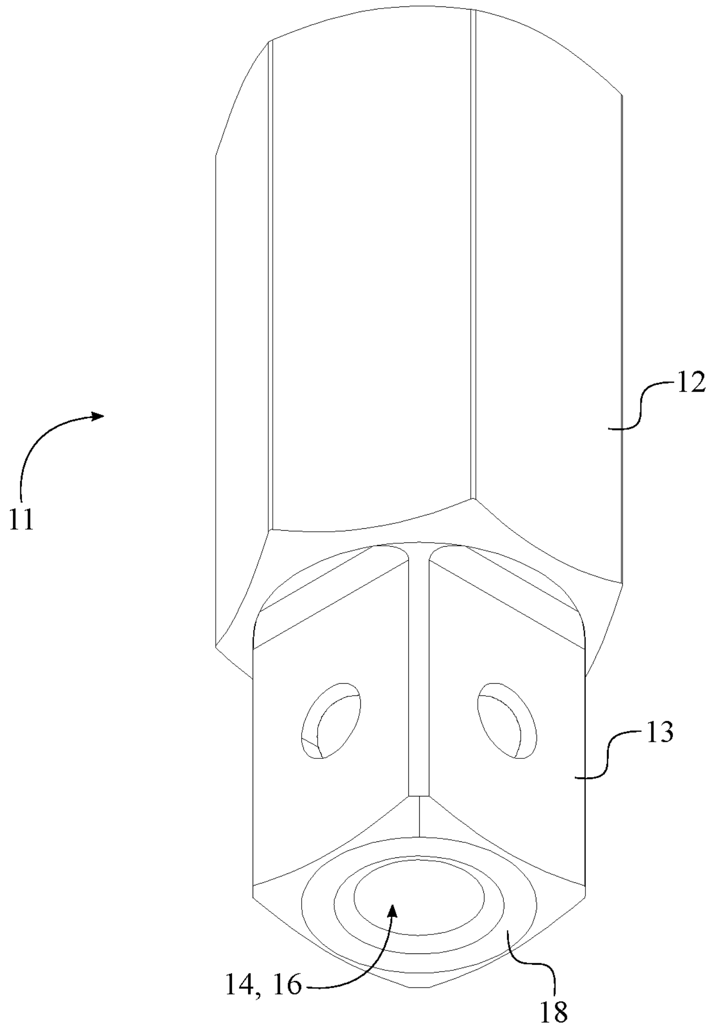
FIG. 6 is a bottom perspective view of the adaptor of the present invention.
Figure 7:
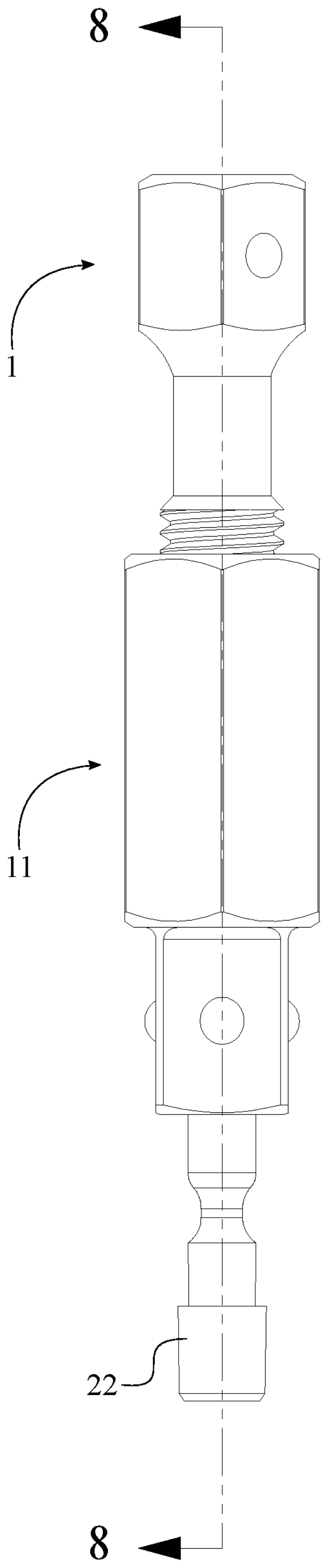
FIG. 7 is a front view of the present invention, wherein the retaining body is outwardly pushed by the elongated section to lock the socket, showing the plane upon which a cross sectional view is taken.
Figure 8:
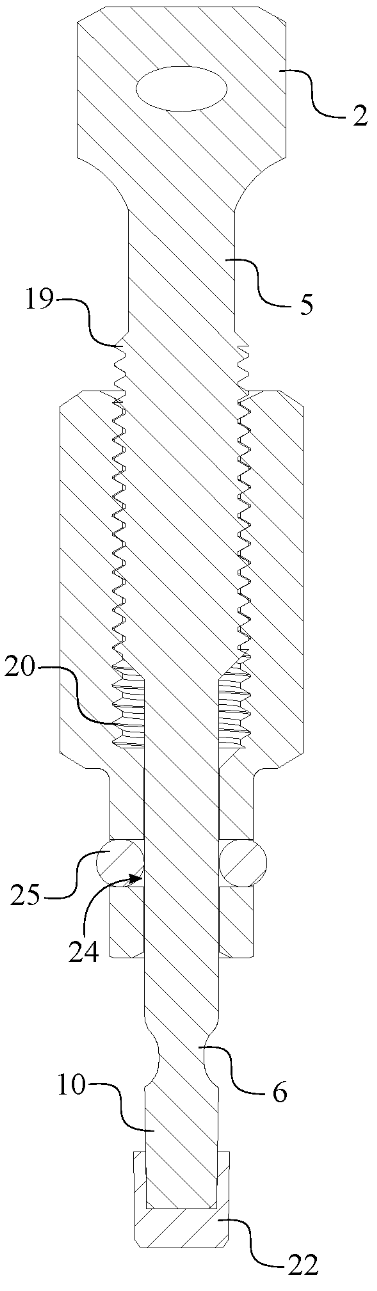
FIG. 8 is a cross section view of the present invention taken along line 8-8 of FIG. 7.
Figure 9:
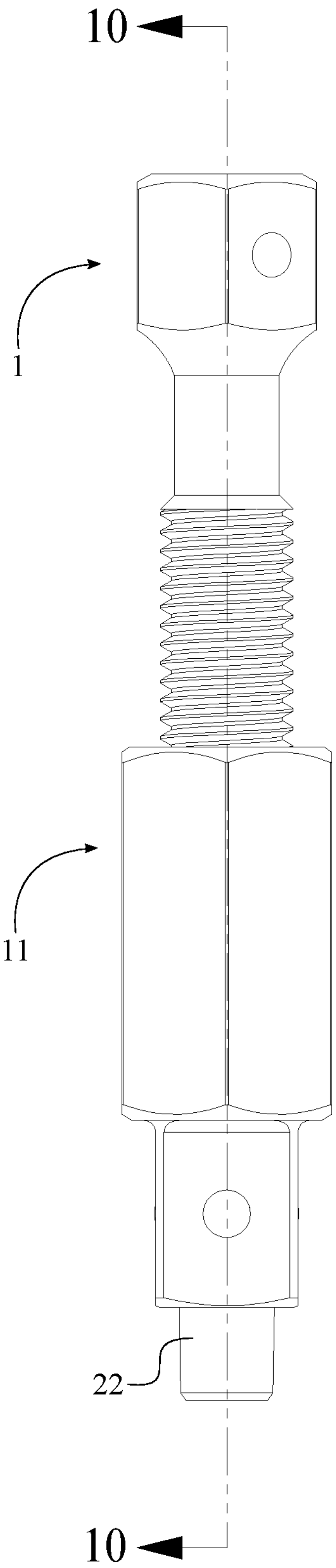
FIG. 9 is a front view of the present invention, wherein the retaining body is neutrally positioned within the cavity due to the placement of the recessed section to release the socket, showing the plane upon which a cross sectional view is taken.

The main channel 14 that facilitates the movement of the main shaft 4 comprises a top channel section 15 and the bottom channel section 16 as shown in FIG. 5-6. The top channel section 15 traverses from a top base 17 of the adaptor 11 and through the entire length of the tool body 12. The bottom channel section 16 traverses from a bottom base 18 of the adaptor 11 and through the entire length of the socket attachment body 13. As a result, the top channel section 15 is intersected with the bottom channel section 16 about the socket attachment body 13 thus dividing the main channel 14 into two different sections. Furthermore, a diameter of the top channel section 15 is larger than a diameter of the bottom channel section 16 so that sufficient tolerance can be provided for the external thread 19 with respect to the tool body 12 and main shaft 4 with respect to the socket attachment body 13. Additionally, the outer diameter of the stop 22 is slightly larger than the diameter of the bottom channel section 16 so that the stop 22 can be pressed against the bottom base 18.

The internal thread 20 is extended along the top channel section 15 and resides along the channel surface of the top channel section 15. As a result, a termination point for the internal thread 20 that is positioned adjacent to the socket attachment body 13 functions as a stop for the elongated section 5. This stop further controls and/or limits the depth the elongated section 5 can be inserted within the top channel section 15. The preferred embodiment, the internal thread 20 is a female-type thread; however, in an alternative embodiment of the present invention, the internal thread 20 can be a male-type thread. The internal thread 20 is utilized within the present invention to threadedly engage with the external thread 19.

In an alternative embodiment of the main channel 14, the top channel 15 may be smaller in diameter than the bottom channel 16, the same diameter as bottom channel 16, or the bottom channel 16 may be larger in diameter than the top channel 15.

Although the invention has been explained in relation to its preferred embodiment, it is to be understood that many other possible modifications and variations can be made without departing from the spirit and scope of the invention as hereinafter claimed.

What is claimed is:

1. A foreign object removing socket adaptor comprising:

a pusher;

an adaptor;

an external thread;

an internal thread;

a stop;

at least one retaining assembly;

the pusher comprising a drive head and a main shaft;

the adaptor comprising a tool body, a socket attachment body, and a main channel;

the retaining assembly comprising a cavity and a retaining body;

the pusher, the adaptor, the external thread, and the internal thread being concentrically positioned around a rotational axis;

the drive head and the main shaft being adjacently connected to each other;

the external thread being laterally connected around the main shaft;

the stop being connected to the main shaft, opposite of the drive head;

the tool body and the socket attachment body being adjacently connected to each other;

the main channel concentrically traversing through the tool body and the socket attachment body;

the internal thread being laterally connected within the main channel;

the main shaft being threadedly engaged with the main channel through the external thread and the internal thread;

the cavity laterally traversing into the main channel through the socket attachment body; and the retaining body being engaged with the cavity.

2. The foreign object removing socket adaptor as claimed in claim 1 comprising:

the pusher further comprising a torque-applying opening;

the torque-applying opening laterally traversing through the drive head; and the torque-applying opening being oriented perpendicular to the main shaft.

3. The foreign object removing socket adaptor as claimed in claim 1 comprising:

the main shaft comprising an elongated section, a recessed section, and a tip section;

the elongated section and the tip section being oppositely positioned of each other about the recessed section;

the elongated section, the recessed section, and the tip section being concentrically positioned along the rotational axis;

the elongated section terminally connected to the recessed section;

the tip section being terminally connected to the recessed section; and the drive head being terminally connected to the elongated section, opposite of the recessed section.

4. The foreign object removing socket adaptor as claimed in claim 3 comprising:

the recessed section comprising a first tapered section, a flat section, and a second tapered section;

the first tapered section and the second tapered section being oppositely positioned of each other about the flat section;

the first tapered section being terminally connected to the elongated section and the flat section; and the second tapered section being terminally connected to the tip section and the flat section.

5. The foreign object removing socket adaptor as claimed in claim 3 comprising:

the external thread being laterally connected around the elongated section;

the external thread being positioned in between the recessed section and the drive head; and a height of the external thread being smaller than a height of the elongated section.

6. The foreign object removing socket adaptor as claimed in claim 3, wherein the stop is radially connected around the tip section.

7. The foreign object removing socket adaptor as claimed in claim 1 comprising:

the main channel comprising a top channel section and a bottom channel section;

the top channel section traversing from a top base of the adaptor;

the top channel section traversing through the tool body;

the bottom channel section traversing from a bottom base of the adaptor;

the bottom channel section traversing through the socket attachment body;

the top channel section being intersected with the bottom channel section about the socket attachment body; and the internal thread being extended along the top channel section.

8. The foreign object removing socket adaptor as claimed in claim 7, wherein an outer diameter of the stop is larger than a diameter of the bottom channel section.

9. The foreign object removing socket adaptor as claimed in claim 7, wherein a diameter of the top channel section is larger than a diameter of the bottom channel section.

* * * * *